Patented Mar. 31, 1942

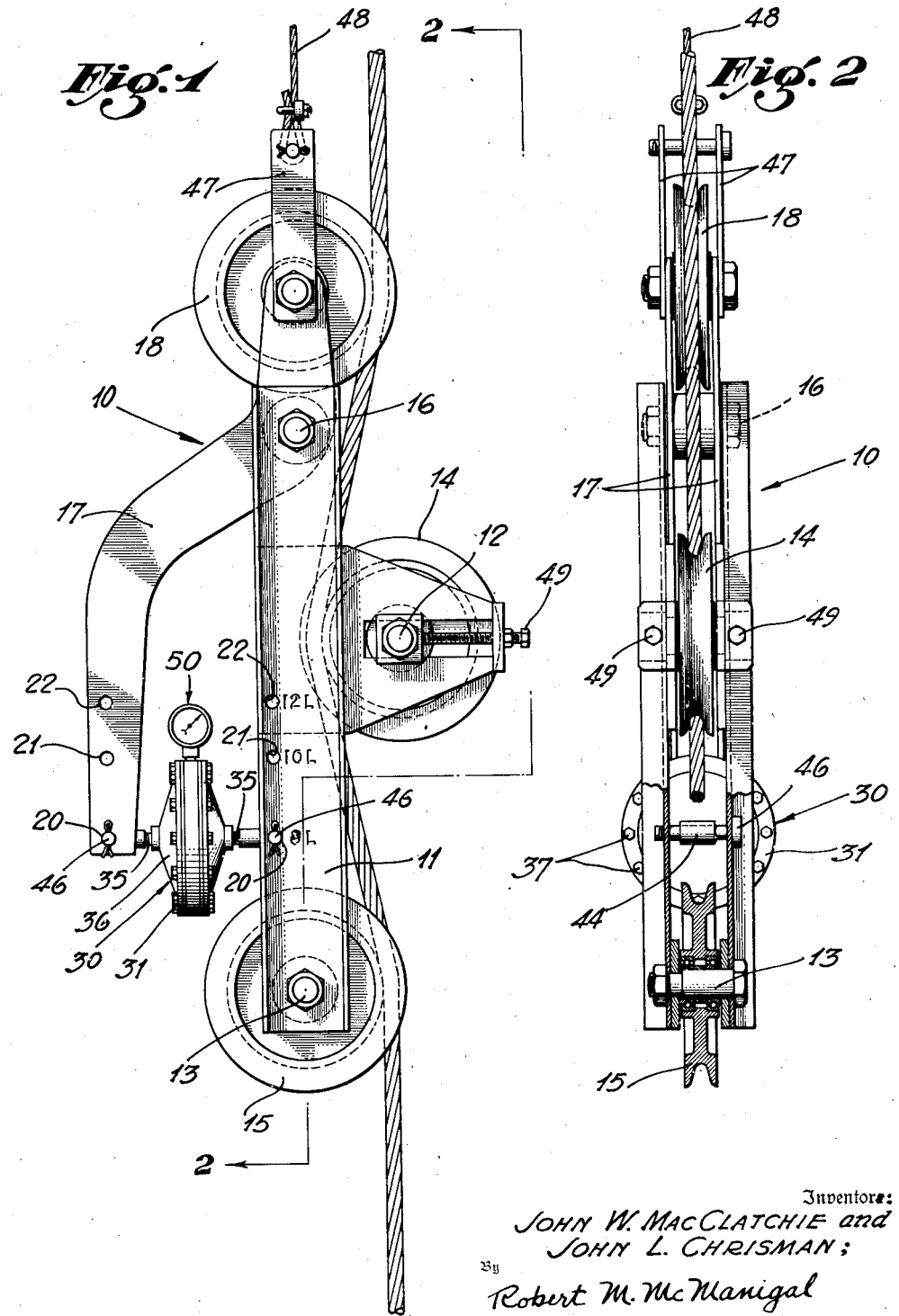

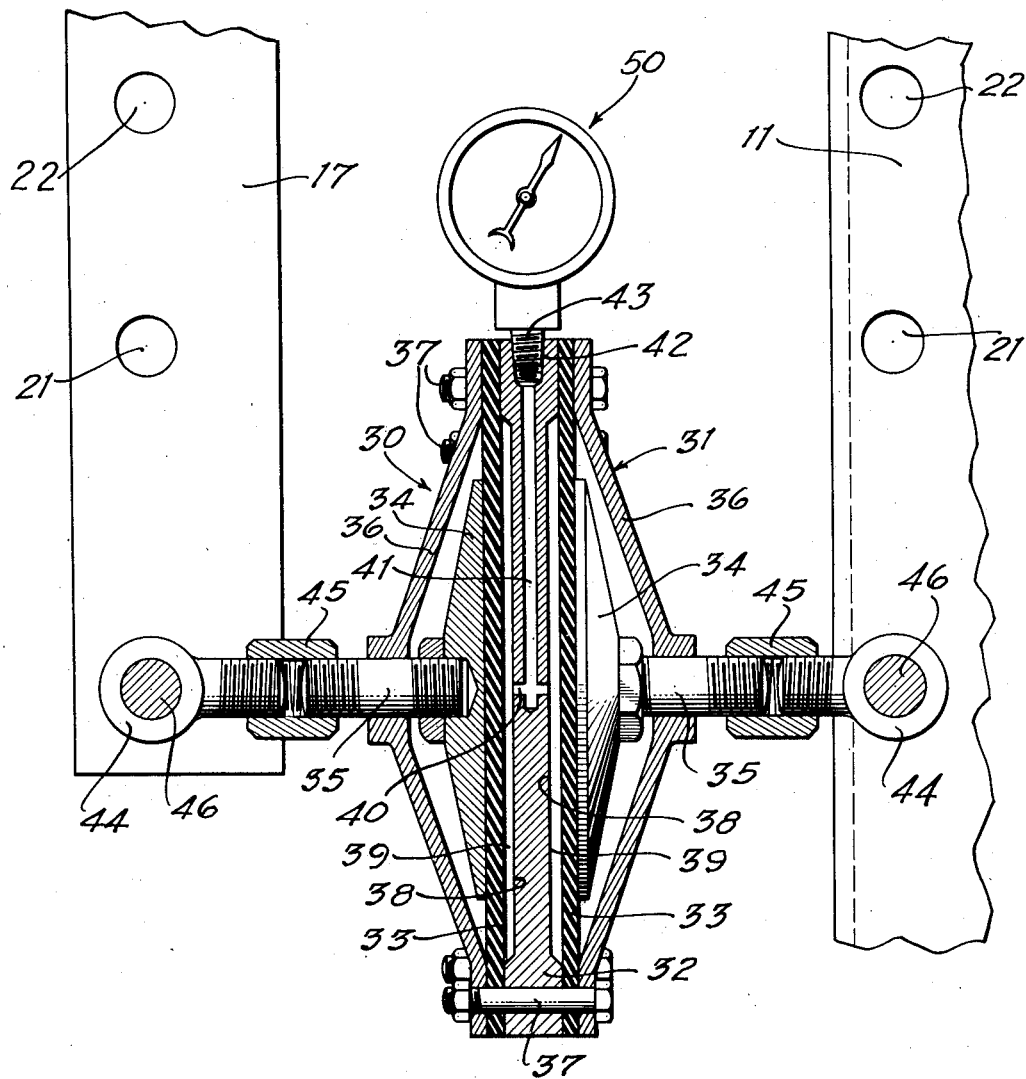

2,277,925

UNITED STATES PATENT OFFICE 2,277,925

WEIGHT INDICATOR

John W. MacClatchie and John L. Chrisman, Los Angeles, Calif., assignors to MacClatchie Manufacturing Company of California, Compton, Calif., a corporation of California Application December 16, 1939, Serial No. 309,628

2 Claims. (Cl. 265—1.6)

This invention relates to weight indicators to indicate the weight on cables and the like, and particularly to indicate the weight suspended from drilling cable systems in well drilling.

The main object of our invention is to provide a weight indicator in which the readings are directly proportional to the load suspended from the drilling cable system.

Another object of our invention is to provide a weight indicator with means to compensate for the mechanical advantages of the drilling cable system in order to obtain direct readings of the total load applied by the use of a single indicating unit.

Another object of our invention is to provide a weight indicator in which the position of the drilling cable can be easily changed without even touching any part of the weight indicator in any manner whatever.

Another object of our invention is to provide a weight indicator which cannot injure or damage the drilling cable. In other words a weight indicator in which no clamps or the like are applied to the drilling cable, and in which no sharp bends are introduced into the drilling cable.

Another object of our invention is to provide a weight indicator in which readings may be readily obtained while the "dead-line" of the drilling cable is moved in either direction.

Our invention has many other objects, advantages, and features, some of which, with the foregoing, will be set forth at length in the following description where we shall outline certain forms of our invention, which we have selected for illustration in the drawings accompanying and forming a part of the present specification.

Referring to the drawings:

Figure 1 is a side elevation of a weight indicator embodying the features of our invention.

Figure 2 is a view partially in section taken on the lines 2—2 of Figure 1.

Figure 3 is an enlarged fragmentary sectional view of the diaphragm unit shown in Figure 1.

The weight indicator shown in the drawings consists of three units, said units being the lever unit 10, the gauge operating device 30 and the indicating gauge or recorder 50.

The lever unit 10 consists of a frame member 11 in which the sheave pins 12, 13 of sheaves 14, 15, are rigidly mounted at predetermined positions. At the upper end of the frame member 11 is an anti-friction pivot pin 16 on which a lever member 17 is adapted to pivot. Anti-frictionally mounted on the upper portion of the lever member 17 is a sheave 18.

Means are provided for adjusting the position of the gauge operating device 30 between said frame member 11 and said lever member 17 in accordance with the mechanical advantage obtained by the drilling cable system whereby a single indicating gauge 50 may be used with drilling cable systems of different mechanical advantage.

As an instance of this arrangement, the frame member 11 and the lever member 17 are provided with a series of holes 20, 21 and 22, respectively, which are so spaced that they are adapted to give direct results on the indicating gauge 50 when the mechanical advantage of the drilling cable system is 8, 10, and 12 respectively Although any suitable gauge operating device may be used, we prefer to use a hydraulic gauge operating device. A diaphragm unit 31 similar to that shown and described in the copending application of Harold A. Raphael filed December 5, 1938, Serial No. 243,907, which has matured into Patent 2,260,401, is mounted in compression between the frame member 11 and the lever member 17. If desired, the gauge operating unit may be mounted in tension by a simple change in the lever system.

As clearly shown in Figure 3, the diaphragm unit 31 consists of a narrow center cylinder 32, diaphragms 33, deflection plates 34 provided with deflection plugs 35, and bonnets 36, which are secured together by means of bolts 37. The center cylinder 32 may be constructed from a section of boiler plate and is preferably, but not necessarily, less than one inch in thickness, in order to provide a minimum of material which is subject to change in atmospheric temperatures. The opposite sides of the cylinder are preferably hollowed out as indicated at 38 in order to provide for fluid chambers 39. The fluid chambers 39 are connected together by a transverse bore 40. A radial bore 41 communicates with transverse bore 40 and the outer end of said radial bore is threaded as indicated at 42. A nipple 43 is threaded into said radial bore 41 and communicates with a conventional fluid pressure gauge 50. The gauge 50 while shown closely positioned relative to the diaphragm unit may, as in actual practice, be located adjacent the drawworks or at any other point as desired.

As clearly shown in the drawings, the outer ends of the deflection plugs 35 are connected to bearing members 44 by means of sleeves 45 having right and left hand threads as in a turnbuckle. The bearing members 44 are adapted to receive pins 46 for attachment to the frame member 11 and the lever member 17 respectively. The adjustable feature is provided so that the alignment of the lever member 17 can be varied with respect to the frame member 11 in order to compensate for errors in the construction of the frame member 11, the lever member 17 and the sheaves 14, 15, and 18, to compensate for the use of drilling cables of different diameters and to compensate for changes in temperature. The diaphragm unit 31 is adapted to be mounted in the position indicated by the drilling cable system in conjunction with which the weight indicator is used. For example, if there are 8 lines of drilling cable between the crown block and the traveling block, the bearing members 44 are mounted in the openings 20, as shown in Figures 1 and 2.

The lever unit 10 is adapted to be securely hung from the derrick. The lever member 17 is provided with a bail 47 and a cable 48 for that purpose and the cable is adapted to be fastened to any convenient girt of the derrick above the lever unit 10.

After the lever unit 10 is securely hung from the derrick, the sheave 14 is removed and the grooves of sheaves 15 and 18 placed against the "dead-line." The sheave 14 is then placed in position with the drilling cable in the groove of said sheave, and the proper deflection placed in the drilling cable by moving the sheave 14 towards the frame member 11 by means of tightening bolts 49.

As the load is applied to the drilling cable system, the drilling cable tends to straighten out, thereby moving the sheave 18 to the left and the lower part of the lever member 17 to the right, thereby causing the deflection plates 34 to move toward the center cylinder 32, flexing the diaphragms 33, and forcing a portion of the fluid in the fluid chambers 39 to flow through the bores 40 and 41, to the gauge 50 to operate said gauge.

By reading the gauge 50, one may ascertain the amount of weight suspended from the drilling cable system.

One of the most important advantages of our invention is that once the lever unit is in position the operator can complete his well without having to manipulate the lever unit in respacing the drilling cable. The drilling cable is adapted to be freely moved in both directions through the lever unit. This is an important feature in that operators have found that the length of useful service of a drilling cable can be materially increased by frequent movement of the drilling cable so that new portions of the cable are placed in contact with the drawworks, the crown block, and the traveling block and therefore move the position of the drilling cable at frequent intervals.

Another big advantage is that no clamps or other means are attached to the drilling cable, and no sharp bends are introduced into said cable.

It will also be seen by those skilled in the art that the gauge readings will be in direct proportion to the weight suspended from the drilling cable system and that means are provided to compensate for mechanical advantage of the drilling cable system in order to provide direct readings of the total suspended load by the use of a single indicating unit.

While the invention has been particularly described with reference to well drilling apparatus it will be understood that the weight indicator of our invention is adapted to indicate the weight on any cable or other flexible element under tension.

In the claims we have used the word gauge to include a recorder and other indicating means.

From the foregoing description taken in connection with the accompanying drawings, the construction, uses, operation, and advantages of our invention will be readily understood by those skilled in the art to which the invention appertains. While we have described the principle of operation together with the form of our invention which we now consider to be the best embodiment thereof, we desire to have it understood that the weight indicator shown is merely illustrative and that the invention is not to be limited to the details disclosed herein, but is to be accorded the full scope of the appended claims.

We claim:

1. Apparatus for measuring the tension in a cable and for providing gauge readings directly proportional to the tension in the cable, comprising a rigid member having a first cable bearing support at one end thereof, a second cable bearing support intermediate the ends thereof, a lever pivoted to the end of said rigid member opposite to said first cable bearing support, one end of said lever extending outwardly from the pivot point beyond the end of said rigid member and the other end of said lever extending from the pivot point alongside said rigid member, a third cable bearing support at the first mentioned end of said lever in such position as to cause a cable passing over all of said cable bearing supports to be deflected and to cause the cable to impose a stress on said third cable bearing support directly proportional to the tension in the cable for any fixed deflection of the cable, a gauge operating device interposed between the second mentioned end of said lever and said rigid member and capable of operating a gauge associated therewith in response to a wide range of stresses imposed thereon by said lever and at the same time of maintaining said lever against substantial pivoting with consequent maintenance of the deflection of the cable substantially constant, and a gauge associated with said gauge operating device.

2. Apparatus for measuring the tension in a cable and for providing gauge readings directly proportional to the tension in the cable, comprising a rigid member having a first cable bearing support at one end thereof, a second cable bearing support intermediate the ends thereof, a lever pivoted to the end of said rigid member opposite to said first cable bearing support, one end of said lever extending outwardly from the pivot point beyond the end of said rigid member and the other end of said lever extending from the pivot point alongside said rigid member, a third cable bearing support at the first mentioned end of said lever in such position as to cause a cable passing over all of said cable bearing supports to be deflected and to cause the cable to impose a stress on said third cable bearing support directly proportional to the tension in the cable for any fixed deflection of the cable, a hydraulic gauge operating device interposed between the second mentioned end of said lever and said rigid member, said hydraulic gauge operating device embracing means for distributing stress imposed thereon over a substantial area of fluid to thus cause operation of a hydraulic gauge associated therewith in response to said stresses while at the same time maintaining said lever against substantial pivoting with consequent maintenance of the deflection of the cable substantially constant, and a hydraulic gauge associated with said gauge operating device.

JOHN W. MacCLATCHIE.
JOHN L. CHRISMAN.